Dec. 22, 1925.
L. G. SEIBERLICH
1,566,981
LOFT STAIRWAY
Filed Oct. 20, 1924
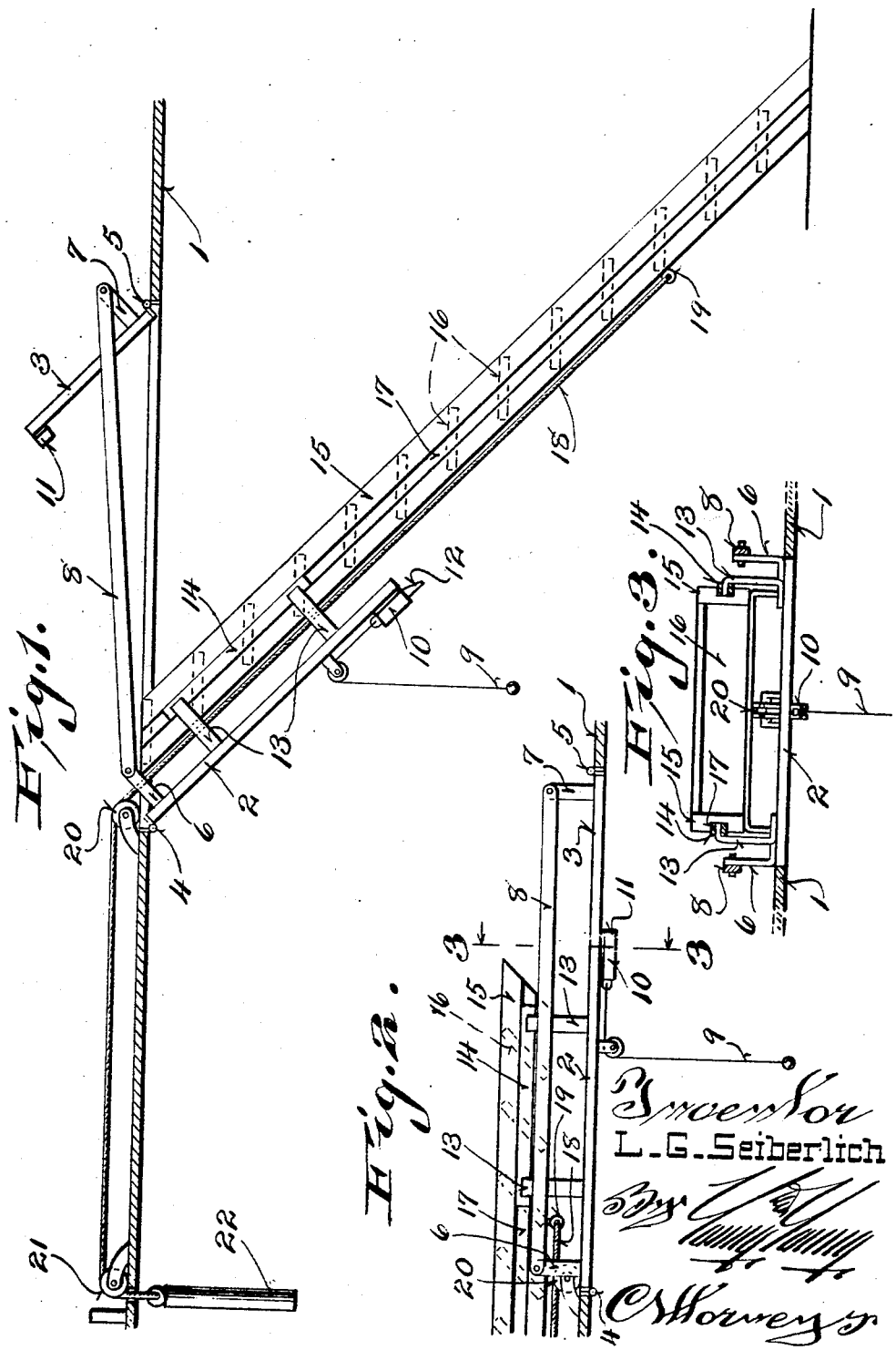

Patented Dec. 22, 1925.

1,566,981

UNITED STATES PATENT OFFICE.

LOUIS G. SEIBERLICH, OF OSHKOSH, WISCONSIN.

LOFT STAIRWAY.

Application filed October 20, 1924. Serial No. 744,801.

*To all whom it may concern:*

Be it known that I, LOUIS G. SEIBERLICH, a citizen of the United States, and resident of Oshkosh, in the county of Winnebago and State of Wisconsin, have invented certain new and useful Improvements in Loft Stairways; and I do hereby declare that the following is a full, clear, and exact description thereof.

This invention relates to loft stairways.

In gaining access to lofts it has been the custom to employ trap doors and a removable ladder which was merely placed in position each time an ascent was made. This necessitates a storing of the ladder and repositioning of the ladder at each use.

This invention is designed to overcome the above noted defects, and objects of such invention are to provide a loft stairway which is so constructed that the mere opening of the trap door will position a stair case in place, and to provide a device in which the closing of the trap door is accomplished by the weight of the stair case when such stair case has been pushed into its retracted position.

Further objects are to provide a loft stair way which is so constructed that it may be easily operated, which is adequately counterbalanced, thus insuring easy operation, and which is so constructed that the unlatching mechanism for the trap door will also open the trap door.

An embodiment of the invention is shown in the accompanying drawings, in which:—

Figure 1 is a sectional view through a loft showing the stair case in its active position.

Figure 2 is a fragmentary view corresponding to Figure 1 showing the stair case stored.

Figure 3 is a transverse sectional view on the line 3—3 of Figure 2.

Referring to the drawings, it will be seen that the loft is provided with a floor 1 equipped with a relatively long trap door 2 and a relatively shorter trap door 3. The trap door 2 is hinged on its under side, as indicated at 4, and the trap door 3 is hinged on its upper side, as indicated at 5. These trap doors are provided with upwardly extending arms 6 and 7. These arms may conveniently consist of angle members, as shown clearly in Figure 3, and are positioned on opposite sides of the trap doors. They are joined by means of the pitmen 8 which causes the simultaneous rocking of the members 6 and 7, and consequently the simultaneous rocking of the trap doors 2 and 3. It is to be noted, however, that when the door 2 is rocked downwardly by pulling upon the chain or cord 9, that the trap door 3 is rocked upwardly, as shown in Figure 1.

The trap doors are provided with cooperating parts 10 and 11 which latch the doors when in closed position. For example, the portion 10 may be provided with a beveled plunger 12 operated through suitable levers and by means of the string or chain 9 although any form of latch of this general order may be employed without departing from the spirit of this invention.

The trap door 2 is provided on each side with spaced uprights 13 which have inwardly turned ends received in and secured to a hardwood strip 14 (see Figures 1 and 3) or other suitable member which forms a slide and is held by the spaced members 13, as most clearly shown in Figure 1.

A stairway is provided which has side bars 15 and steps 16. The side bars 15 are provided with grooves 17 within which the hardwood strips or guides are adapted to slide.

In order to compensate or partially counterbalance the weight of the stair case, a rope 18 is secured, as indicated at 19, to an intermediate portion of the stair case and upon its under side. This rope runs over a pulley 20 adjacent the hinged end of the door 2, as shown in Figure 1, and from thence over a pulley 21, and extends downwardly to a weight 22.

In operating the apparatus, the cord or chain 9 is pulled downwardly thus releasing the latch by withdrawing the plunger 12. Further motion of the chain 9 pulls the door 2 downwardly and allows the stair case to slide downwardly into the position shown in Figure 1. When it is desired to close the trap door and store the stair case, it is merely necessary to push the stair case upwardly. Thereafter, the overhanging end of the stair case will overbalance the weight of the door 2 and will cause such door to close and the latch to snap into locking position.

It is to be noted that the door 3 is opened simultaneously with the door 2 by means of the pitmen 8 and the uprights 6 and 7, thus providing an adequate amount of head room.

It will thus be seen that a loft stair way has been provided which may be easily operated, which provides for the storing of the stair case when not in use, which may be quickly changed from operative to inoperative position, and which is adequately counter-balanced so as to require a minimum of effort for its operation.

Although the invention has been described in considerable detail, it is to be understood that the invention may be variously embodied and is, therefore, to be limited only as claimed.

I claim:

In a loft stair construction, the combination of a floor provided with an opening therethrough, a pair of trap doors pivoted to said floor adjacent said opening and adapted to be rocked in opposite directions, link mechanism connecting said trap doors and causing simultaneous motion thereof, a latch having cooperating portions carried by said trap doors and having a downwardly extending release cord, guides carried by the downwardly opening trap door, a ladder having a groove formed in each side thereof for the reception of said guides, a rope attached to said ladder at a point intermediate its ends, pulleys carrying said rope, and a counter weight attached to the other end of said rope.

In testimony that I claim the foregoing I have hereunto set my hand at Oshkosh, in the county of Winnebago and State of Wisconsin.

LOUIS G. SEIBERLICH.